US012107431B2

United States Patent
Zeine

(10) Patent No.: US 12,107,431 B2
(45) Date of Patent: Oct. 1, 2024

(54) WIRELESS POWER SYSTEM TECHNOLOGY IMPLEMENTED IN LIGHTING INFRASTRUCTURE

(71) Applicant: Ossia Inc., Redmond, WA (US)

(72) Inventor: Hatem Ibrahim Munir Zeine, Woodinville, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/384,691

(22) Filed: Jul. 23, 2021

(65) Prior Publication Data

US 2021/0351616 A1    Nov. 11, 2021

Related U.S. Application Data

(63) Continuation of application No. 16/715,542, filed on Dec. 16, 2019, now Pat. No. 11,095,153.

(60) Provisional application No. 62/818,858, filed on Mar. 15, 2019.

(51) Int. Cl.
| | |
|---|---|
| *H02J 50/00* | (2016.01) |
| *B27B 27/02* | (2006.01) |
| *B27B 27/10* | (2006.01) |
| *F21V 19/00* | (2006.01) |
| *H05B 45/10* | (2020.01) |
| *B23D 47/02* | (2006.01) |
| *F21Y 115/10* | (2016.01) |

(52) U.S. Cl.
CPC .............. *H02J 50/00* (2016.02); *B27B 27/02* (2013.01); *B27B 27/10* (2013.01); *F21V 19/0055* (2013.01); *H05B 45/10* (2020.01); *B23D 47/025* (2013.01); *F21Y 2115/10* (2016.08)

(58) Field of Classification Search
CPC ...... H02J 50/00; F21V 19/0055; H05B 45/10; F21Y 2115/10
See application file for complete search history.

(56) References Cited

U.S. PATENT DOCUMENTS

| | | | |
|---|---|---|---|
| 8,487,478 B2 | 7/2013 | Kirby et al. | |
| 8,786,435 B2 | 7/2014 | Barnett et al. | |
| 2007/0191075 A1* | 8/2007 | Greene | H02J 50/20 455/299 |

(Continued)

FOREIGN PATENT DOCUMENTS

| | | |
|---|---|---|
| CN | 106451814 A | 2/2017 |
| GB | 2564904 A | 1/2019 |

(Continued)

OTHER PUBLICATIONS

International Search Report and Written Opinion for International Application No. PCT/US2019/066928 dated Apr. 14, 2020, 18 pages.

(Continued)

*Primary Examiner* — Daniel Cavallari
(74) *Attorney, Agent, or Firm* — Amin, Turocy & Watson, LLP

(57) ABSTRACT

Wireless power transmission is used in conjunction with lighting, such as a light emitting diode (LED) bulb or lighting fixture that uses existing electrical wiring infrastructure. For instance, a lighting device is provided such that a wireless power transmitter is coupled to receive electrical operating power via the lighting device when the lighting device is coupled to electrical wiring infrastructure.

19 Claims, 17 Drawing Sheets

(56) References Cited

U.S. PATENT DOCUMENTS

| | | | |
|---|---|---|---|
| 2008/0169910 A1* | 7/2008 | Greene | H02J 50/70 |
| | | | 340/10.34 |
| 2009/0072766 A1 | 3/2009 | Null | |
| 2010/0194207 A1* | 8/2010 | Graham | F21K 9/27 |
| | | | 307/157 |
| 2013/0005252 A1 | 1/2013 | Lee et al. | |
| 2013/0093259 A1 | 4/2013 | Hente et al. | |
| 2013/0169430 A1 | 7/2013 | Shook | |
| 2014/0253028 A1 | 9/2014 | Lee et al. | |
| 2015/0043194 A1 | 2/2015 | Busby et al. | |
| 2015/0180237 A1 | 6/2015 | Steiner et al. | |
| 2016/0032284 A1 | 2/2016 | Chen et al. | |
| 2016/0221688 A1 | 8/2016 | Moore | |
| 2016/0322847 A1 | 11/2016 | Geiszler | |
| 2018/0351414 A1 | 12/2018 | Park | |
| 2019/0035569 A1* | 1/2019 | Sadwick | H05B 45/20 |

FOREIGN PATENT DOCUMENTS

| | | |
|---|---|---|
| JP | H03-194897 A | 8/1991 |
| JP | 2008-166071 A | 7/2008 |
| JP | 2009-527147 | 7/2009 |
| JP | 2012-223070 | 11/2012 |
| JP | 2013-167559 A | 8/2013 |
| JP | 2014-030349 A | 2/2014 |
| JP | 2017-212849 | 11/2017 |
| JP | 6463865 | 2/2019 |
| KR | 10-2010-0042633 | 4/2010 |
| KR | 10-2013-0108850 | 10/2013 |
| WO | 2017127836 | 7/2017 |
| WO | 2018001785 | 1/2018 |

OTHER PUBLICATIONS

Office Action mailed Dec. 15, 2020 for U.S. Appl. No. 16/715,542, 23 pages.
Notice of Allowance mailed Apr. 15, 2021 for U.S. Appl. No. 16/715,542, 18 pages.
Chinese Office Action mailed Nov. 28, 2022 for Chinese Patent Application No. 201980093809.4, 3 pages (with translation).
Chinese Office Action dated Apr. 24, 2023 for Chinese Patent Application No. 201980093809.4, 23 pages (with translation).
Japanese Notice of Grant mailed Jun. 8, 2023 for Japanese Patent Application No. 2021-555422, 4 pages.
European Search Report mailed Feb. 1, 2023 for European Patent Application No. 19919630.4, 13 pages.
Japanese Office Action dated Feb. 20, 2023 for Japanese Patent Application No. 2021-555422, 6 pages (with translation).
European Office Action mailed Feb. 21, 2023 for European Patent Application No. 19919630.4, 1 page.
Japanese Office Action mailed Oct. 4, 2022 for Japanese Patent Application No. 2021-555422, 19 pages (including translation).
European Office Action mailed Oct. 27, 2022 for European Patent Application No. 19919630.4, 12 pages.
Office Action dated Oct. 13, 2023 for Chinese Patent Application No. 201980093809.4, 27 pages (including translation).
Office Action dated Nov. 28, 2023 for Korean Patent Application No. 10-2021-7029517, 26 pages (including translation).
Office Action dated Mar. 13, 2024 for Chinese Patent Application No. 201980093809.4, 11 pages (including translation).
Office Action dated May 23, 2024 for Chinese Patent Application No. 201980093809.4, 20 pages (including translation).
Japanese Office Action mailed Jul. 9, 2024 for Japanese Patent Application No. 2023-113184, 8 pages (with translation).
Korean Office Action mailed Jul. 17, 2024 for Korean Patent Application No. 10-2021-7029517. 6 pages (with translation).

* cited by examiner

WIRELESS POWER SYSTEM TECHNOLOGY IMPLEMENTED IN LIGHTING INFRASTRUCTURE

RELATED APPLICATION

The subject patent application is a continuation of, and claims priority to, U.S. patent application Ser. No. 16/715,542 (now U.S. Pat. No. 11,095,153), filed Dec. 16, 2019, and entitled "WIRELESS POWER SYSTEM TECHNOLOGY IMPLEMENTED IN LIGHTING INFRASTRUCTURE," each of which applications claims priority to U.S. Provisional Patent Application No. 62/818,858, filed Mar. 15, 2019, and entitled "WIRELESS POWER SYSTEM TECHNOLOGY IMPLEMENTED IN LIGHTING INFRASTRUCTURE," the entireties of which applications are hereby incorporated by reference herein.

TECHNICAL FIELD

The subject disclosure generally relates to embodiments corresponding to wireless power transmission used in conjunction with lighting, such as a light emitting diode (LED) bulb or lighting fixture that uses existing electrical wiring infrastructure, and related embodiments.

BACKGROUND

Directed antenna systems can transmit wireless power over radio frequency (RF) signals to various devices coupled to a wireless power receiver, which provides for wireless power over relatively long distances compared to the short electromagnetic field distances needed for inductive charging-type systems. In general, a wireless power transmitter via an antenna (one or more antenna elements) transmits RF signals to a wireless power receiver comprising an antenna and circuitry that converts the received RF signals into power.

In general, good results are obtained by mounting the wireless power transmitter above the receiver, because this allows for selection among various direct or reflected transmission paths to the receiver that are unobstructed. Thus, incorporating a wireless power transmitter in a ceiling tile or the like provides a desirable solution. However, supplying operating power (e.g., 120 volts AC) to the transmitter can be problematic; e.g., an electrician is typically needed to perform the wiring.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

The technology described herein is generally directed towards using existing electrical wiring infrastructure to supply operating power to a wireless power transmitter. In one aspect, a lighting device can contain the wireless power transmitter circuitry and antenna elements. When the lighting device is coupled to the power source, e.g., by screwing in a light bulb into a socket/fixture, or attaching a tube-shaped lighting device into a corresponding lampholder/socket, power is supplied to the wireless power transmitter.

In another aspect, the lighting device can provide an electrical cable or terminal set to which a separable wireless power transmitter can connect. In yet another aspect, a socket can be provided to which a lighting device and the wireless power transmitter can connect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

Figure 1:
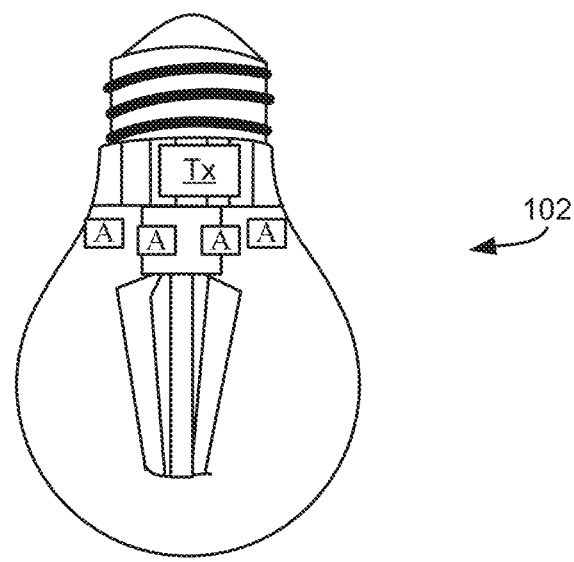
FIGS. 1 and 2 show example lighting devices (in bulb shaped housings), in which each lighting device housing contains a wireless power transmitter and antenna elements, in accordance with various example embodiments of the subject matter disclosed herein.

FIG. 1 shows an example of a lighting device in the shape of a conventional LED bulb 102 which, along with LEDs (light emitting diodes) that emit light, contains a wireless power transmitter Tx coupled to antenna elements A. In general, the antenna elements A are positioned to not block (or barely block) the emitted light, and can, for example, be arranged in a ring like pattern around the bulb or the base of the bulb. Note that the technology is not limited to LEDs, and can for example be implemented in an incandescent lamps, fluorescent lamps, compact fluorescent lamps, cold cathode fluorescent lamps, high-intensity discharge lamps, and so on.

Figure 2:
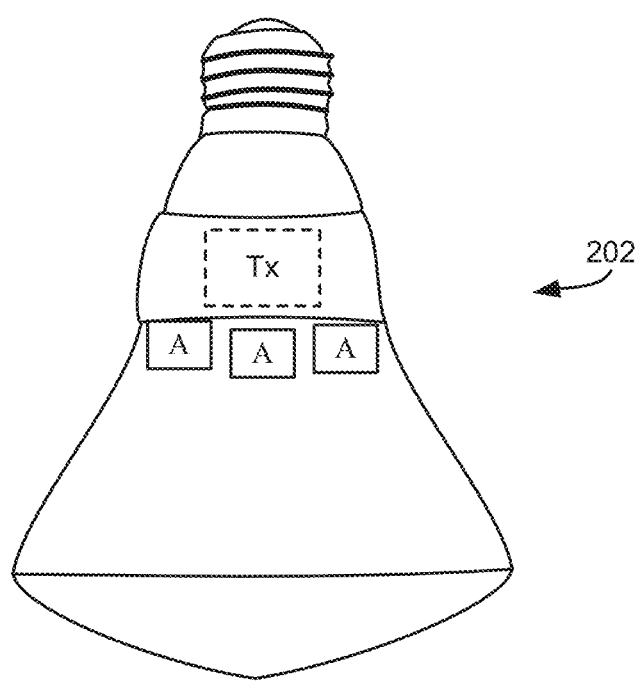

FIG. 2 depicts a similar lighting device 202 in the shape of a floodlight-style LED bulb, which also incorporates a wireless power transmitter and antenna elements.

Figure 3:
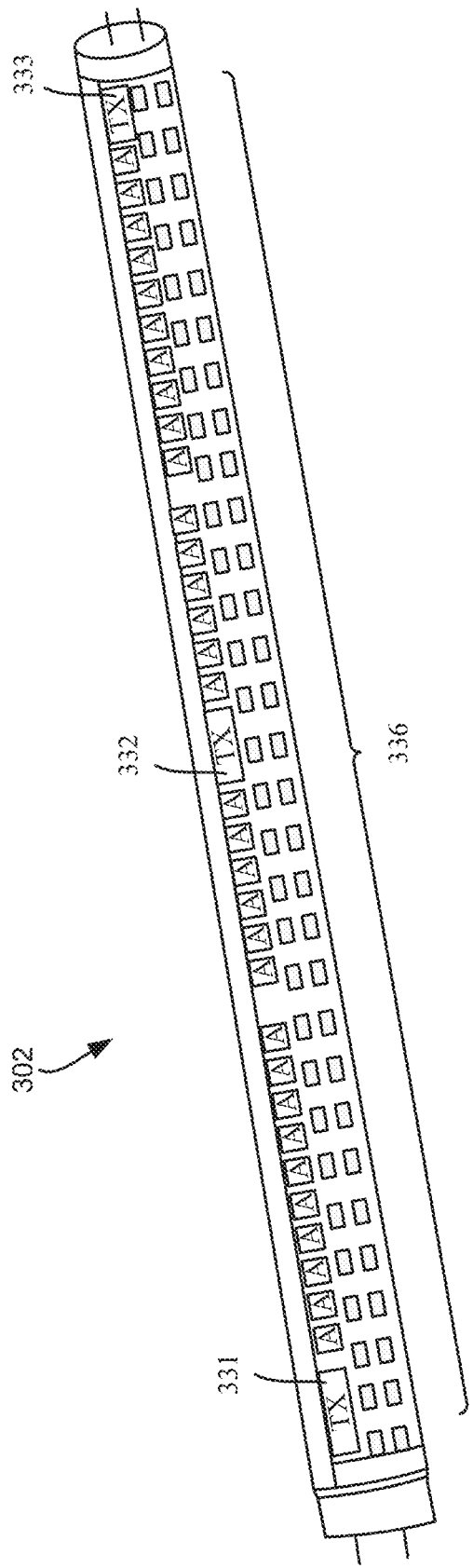
FIG. 3 shows an example lighting device (in a tube-shaped housing), in which the housing contains a wireless power transmitter and antenna elements, in accordance with various example embodiments of the subject matter disclosed herein.

FIG. 3 depicts a tube-shaped lighting device 302. In one example implementation, a number of wireless power transmitters 331-333, each with a number of (e.g. ten) antenna elements are positioned lengthwise within the tubular structure, e.g., generally parallel to an array of LEDs 336 also within the tubular structure. Any practical number of transmitters (as few as one) and antenna elements can be incorporated into such a lighting device.

It should be noted that tube shaped LED "shop lights" are commercially available as a single, pluggable unit built into a fixture that is hung from (or otherwise attached to) a surface such as a ceiling and plugs in to a conventional electrical outlet. It is straightforward to implement one or more wireless power transmitters and corresponding antenna elements within such a shop light fixture. In the event that a desirably positioned electrical outlet is already available, a plug-in wireless power transmitter can be used with or without lighting.

In the examples of FIGS. 1-3, there is often a wall switch ("light switch") that needs to be closed to supply operating power to the socket or the like to which the lighting device couples. In such a situation, the wireless power transmitter only receives power when the light switch is closed. If there is sufficient room, a battery can be built into the bulb/tube structure to provide power to the wireless transmitter if power is switched off, however such a battery could only provide such power for a limited time.

Figure 4:
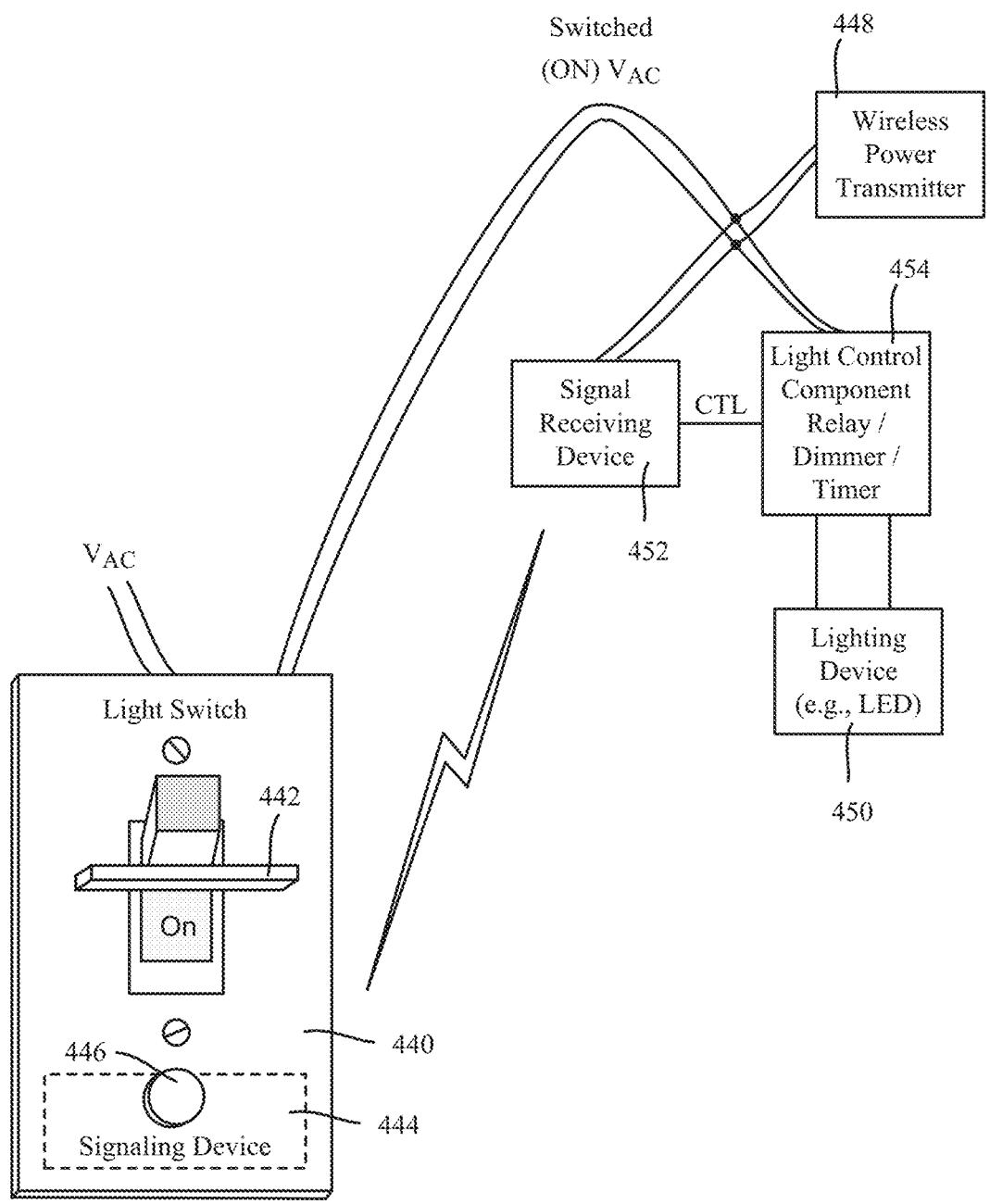
FIG. 4 illustrates an example switch cover plate that locks power to a wireless power transmitter in an "on" state while facilitating control of lighting via lighting-related components, in accordance with various example embodiments of the subject matter disclosed herein.

FIG. 4 shows a switch cover plate 440 that includes a locking component 442 and a signaling device 444, e.g., actuated by a button 446 or the like. In general, the switch cover plate 440 is straightforward to install, and replaces what was the existing switch cover plate. As can be seen, the locking component 442 keeps the switch in a closed position, and thereby continually supplies operating power to the wireless power transmitter 448.

The locking component 442 shown in FIG. 4 is just one possible way to keep the switch closed. Other styles of switches can be similarly locked. Also note that the locking component 442 can be configured to allow for overriding the "always on" state; for example, the locking component 442 can be hinged to swing out or rotate from one end, slid sideways (or up and down—with some effort) or pulled out from tabs/magnets or the like.

To operate the lighting device 450, the signaling device 444 wirelessly couples to a signal receiving device 452 and a light control component 454, e.g., a relay, dimmer and/or timer, etc. When the button 446 is pressed, the signaling device 444 sends a signal to the signal receiving device 452, which in turn sends a control (CTL) signal to the light control component 454, e.g., to toggle a relay and thereby turn on or off the lighting device (or modify the dimmer setting, reset a timer and so on).

Although not explicitly shown in FIG. 4, it is understood that some or all of the components 448, 450, 452 and/or 454) can be incorporated into the light bulb or tube housing structures exemplified in FIGS. 1-3.

A motion sensor or the like can be coupled to the signaling device 446 so that the switch "opens" in the absence of motion and turns off the wireless power transmitter 448 as well as the lighting device 450. Alternatively, a motion sensor can be arranged to only turn off the lighting device 450; it should be noted that the wireless power transmitter 448 can sense motion. Other ways to operate the lighting device 450 and/or the wireless power transmitter 448 can be implemented, e.g., voice commands).

Some way to power the signaling device 444 is needed. In most scenarios, the signaling device 444 can be powered by the wireless power transmitter 448, thereby avoiding the need for a conventional battery or the need to use the electrical power available at the switch to also power the signaling device. In some scenarios where the switch is at a location that is not able to receive wireless power from the wireless power transmitter 448, it is feasible to use a battery, inductive coupling, wiring to the AC source, or possibly a different wireless power transmitter to power the signaling device 444.

Figure 5:
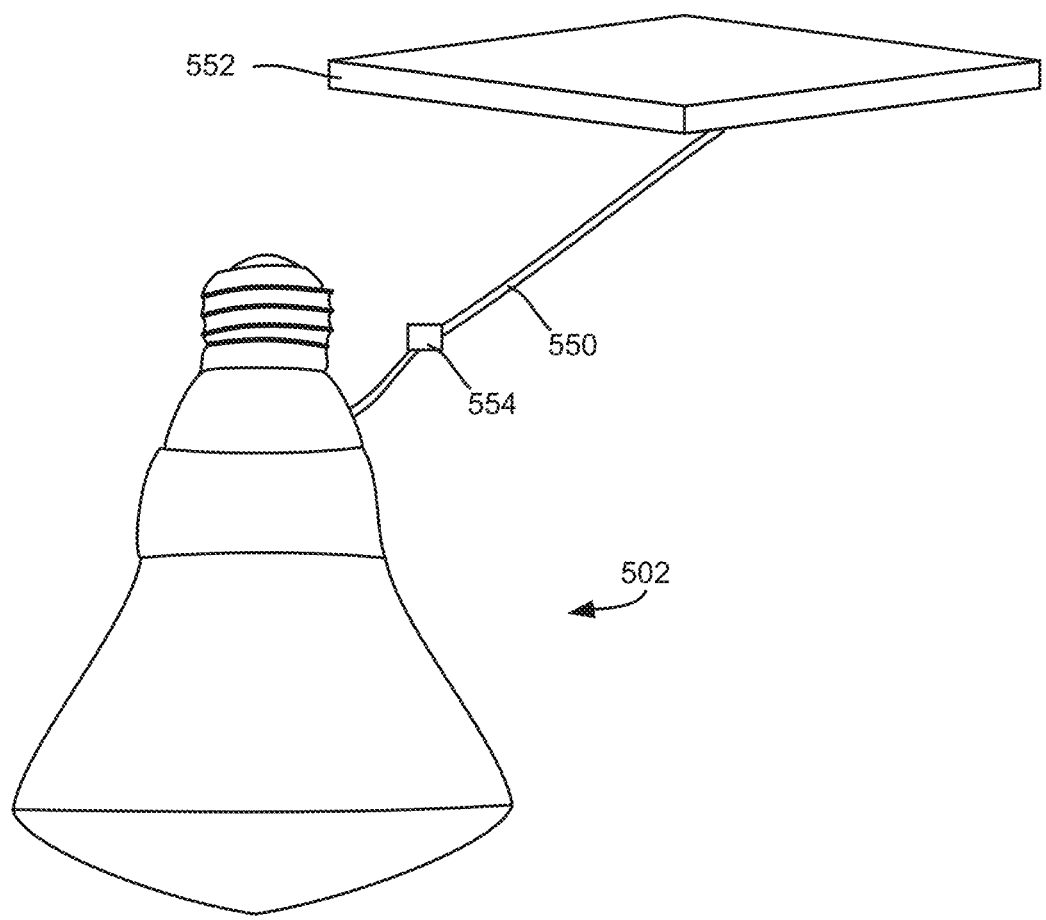
FIG. 5 shows an example lighting device in a bulb shaped housing that electrically couples to a separate wireless power transmitter, in accordance with various example embodiments of the subject matter disclosed herein.

Turning to another aspect, a wireless power transmitter can be physically separated from the lighting device, yet receive power from the lighting device or a component coupled to the lighting device. FIG. 5 shows an example of a bulb housing structure 502 that has an electrical power cable 550 to a separated wireless power transmitter 552. The wireless power transmitter 552 can be mounted to a ceiling or a wall, for example, by an adhesive backing, mounting screws or the like. Note that the bulb housing can be contained in a globe, a can fixture and so forth so that very little of the wire, if any, is visible.

The power over the coupling cable 550 can be AC, or because the LED elements are powered by direct current (DC), the separated wireless power transmitter 552 can be arranged to be powered by DC carried over the cable 550. Note that a coupling plug 554 or the like is shown, so that the bulb housing can be temporality decoupled from the wireless power transmitter 552 to facilitate screwing in the bulb/a replacement bulb.

Figure 6:
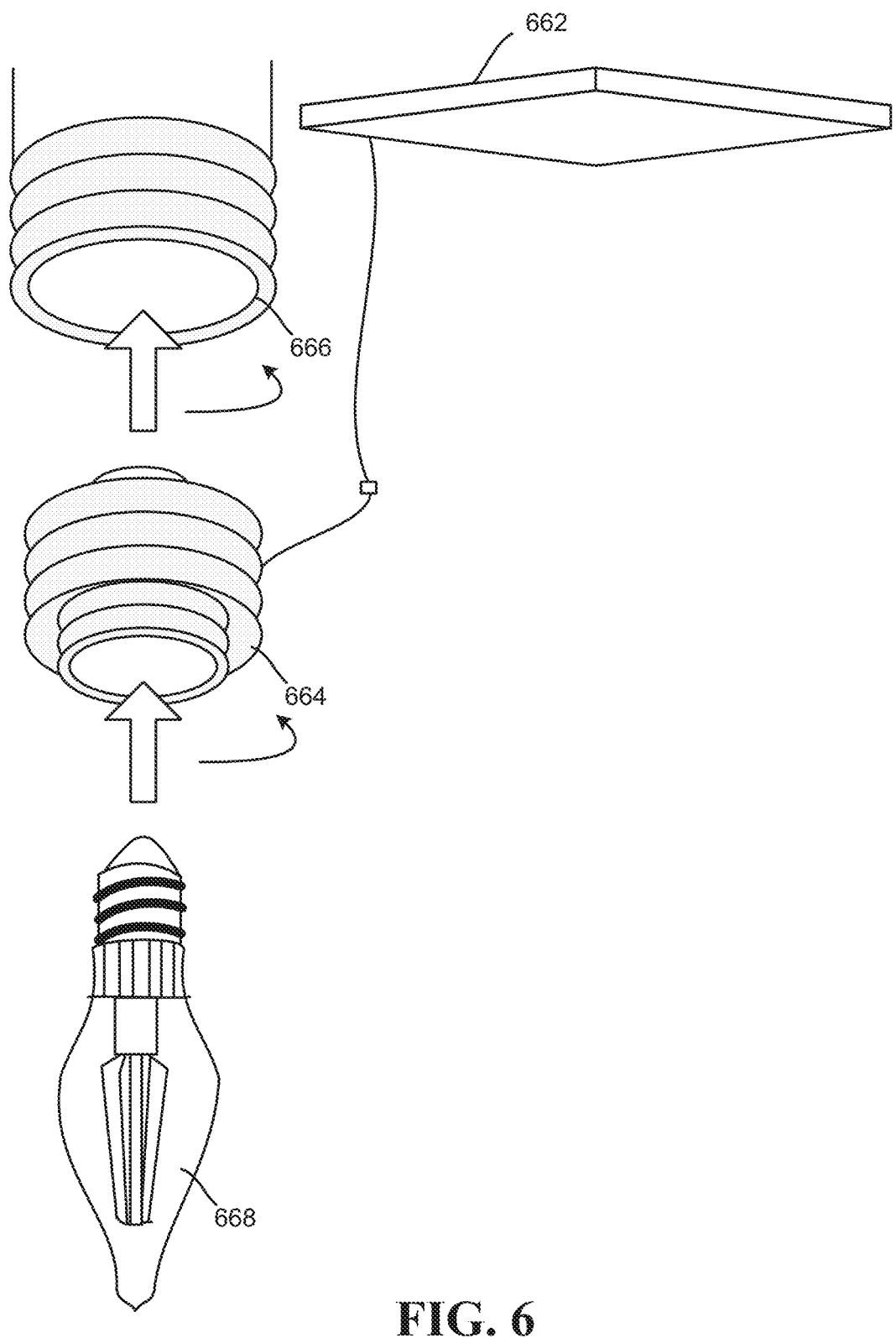
FIG. 6 shows an example lighting device intermediate adapter socket that electrically couples to a physically separated wireless power transmitter, in accordance with various example embodiments of the subject matter disclosed herein.

FIG. 6 shows a similarly physically separated wireless power transmitter 662 that receives electrical operating power from an intermediate socket 664. In general, the intermediate socket 664 screws into a fixture socket 666, and acts as an adapter socket for a smaller bulb base.

Figure 7:
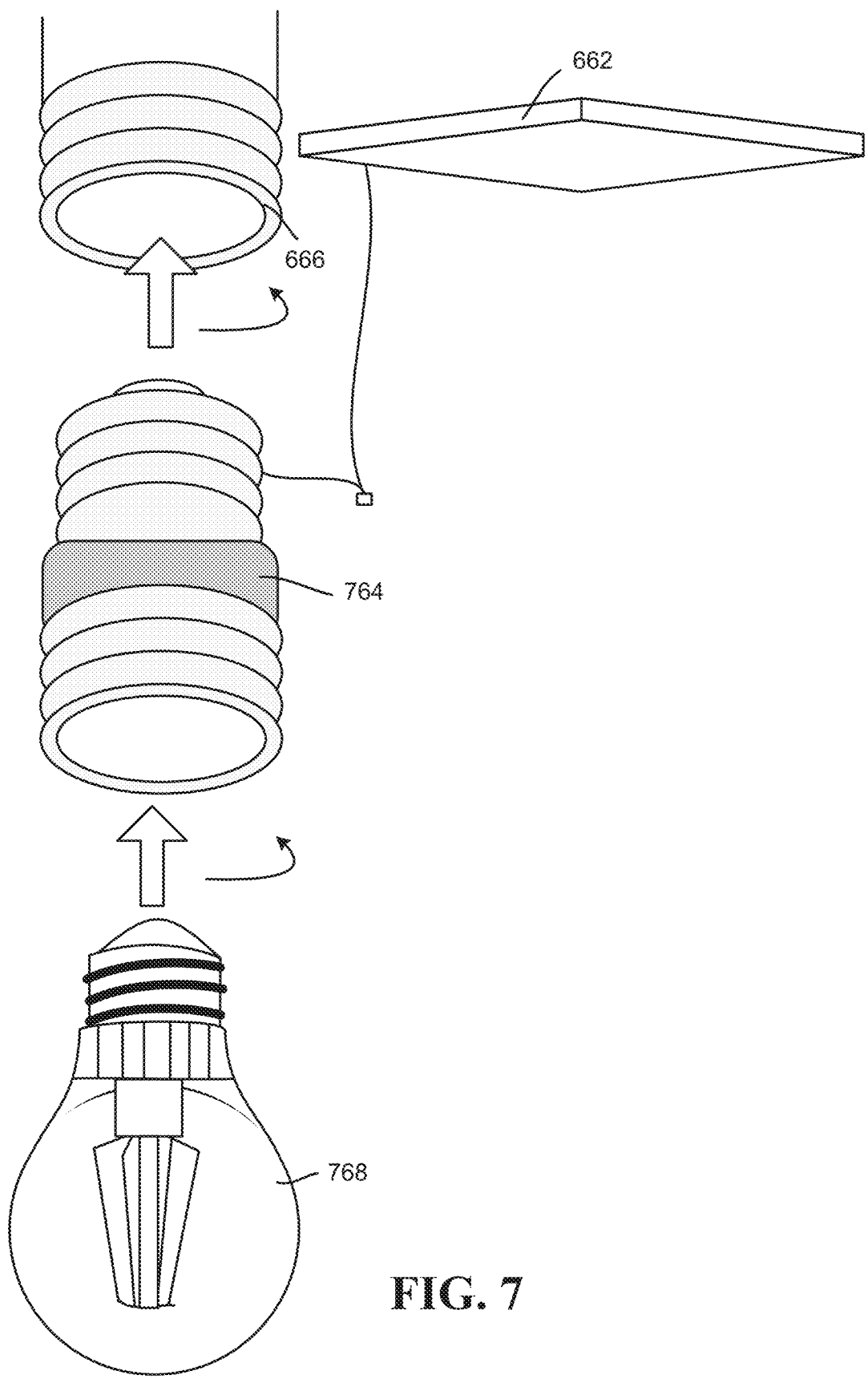
FIG. 7 shows an example lighting device intermediate socket component that electrically couples to a physically separated wireless power transmitter, in accordance with various example embodiments of the subject matter disclosed herein.

As shown in FIG. 7, if socket length is not a concern, then an intermediate socket 764 (lengthened relative to the intermediate socket 664 of FIG. 6) to accept a bulb 768 with the same size bulb base (or possibly with an even larger bulb base).

Figure 8A:
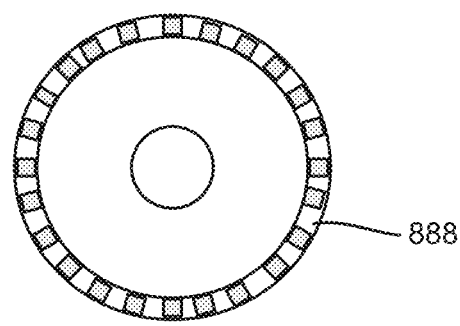
FIGS. 8A and 8B shows a wireless power transmitter incorporated into a trim ring for a can light, in accordance with various example embodiments of the subject matter disclosed herein.
Figure 8B:
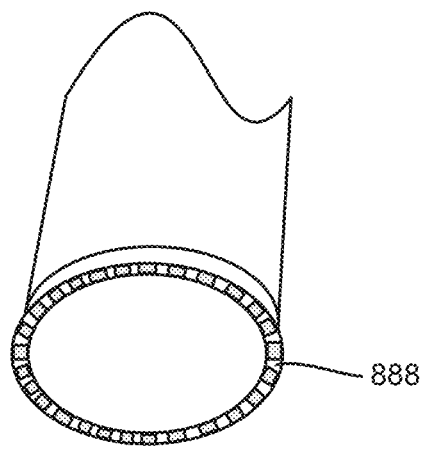

FIGS. 8A and 8B show another implementation of a separated (from the lighting device) wireless power transmitter and antenna elements, such as positioned on a trim ring 888 for a can light, from which power is obtained via a power cable (not explicitly shown). Similar wireless power transmitters can be incorporated into a lamp shade, a light fixture globe cover, a lampshade, a wall sconce and so forth, generally being arranged to block as little of the emitted light as possible.

Although incorporating the wireless power transmitter and antenna elements into a small structure such as a light bulb can limit the amount of power that can be output, in many applications even relatively low wireless power is desirable. Consider for example electronic (generally keyless) locks, such as on the doors of apartment buildings. Power is needed for such a lock to work, but wiring is expensive, and batteries need to be changed.

Figure 10:
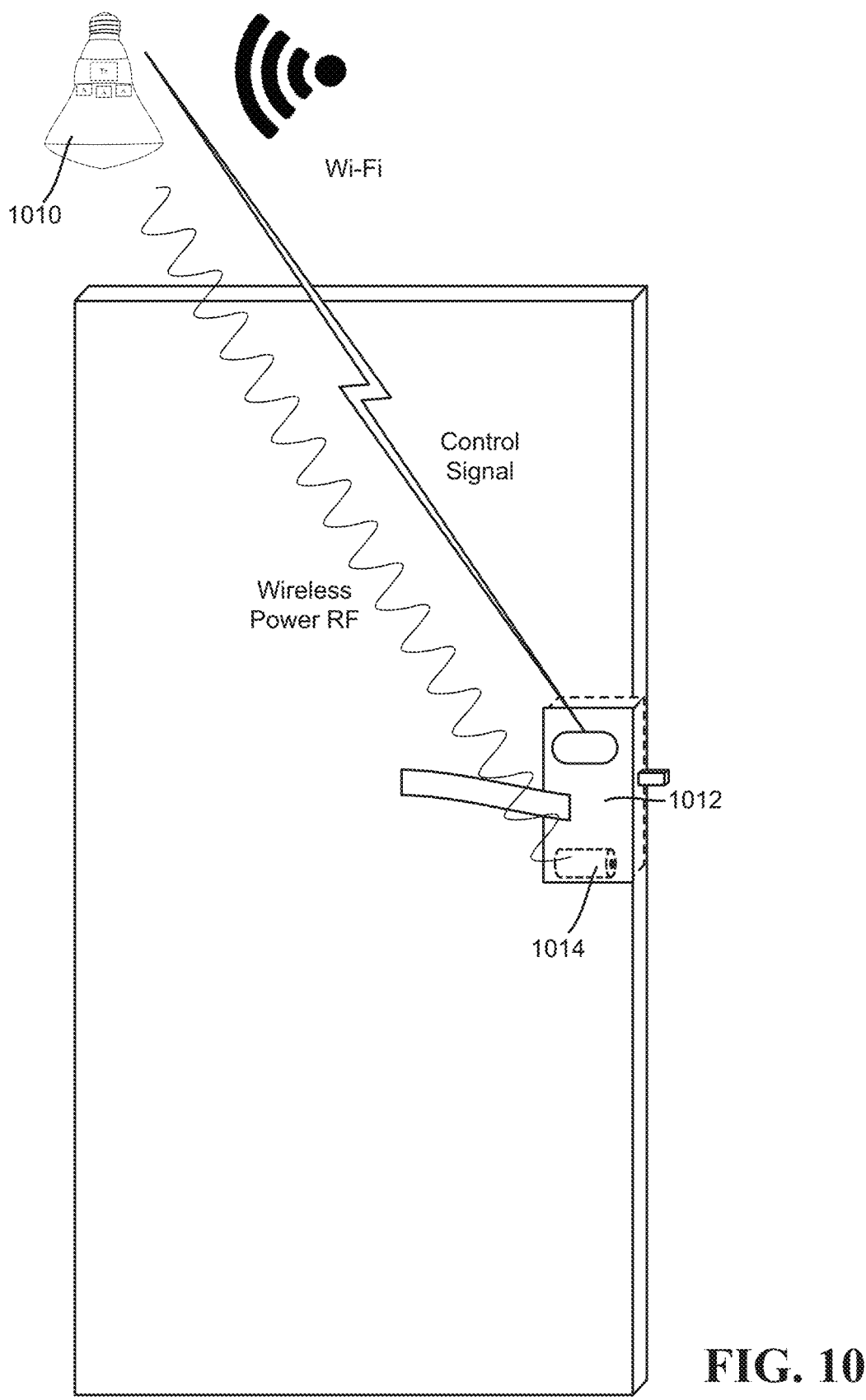
FIG. 10 shows an example lighting device with a wireless power transmitter that controls the functionality of another device (e.g., an electronic door lock), in accordance with various example embodiments of the subject matter disclosed herein.

However, as represented in FIG. 10, many such doors have a light bulb 1010 over them, and thus wireless power from within a light bulb housing provides an inexpensive solution. Note that wireless power receivers can be implemented in housings that match conventionally-sized batteries, and thus a battery-powered lock 1012 need not be modified to accept a wireless power receiver 1014. Further, wireless power receivers contain one or more small batteries within their housings, and thus continue to supply power during power outages. Moreover, in applications such as electronic locks that are typically only used infrequently, the wireless power receiver battery(ies) and can recharge relatively slowly from a lower power transmitter.

In another aspect, consider that multiple light bulbs with wireless power transmitters are present in a room. This can be in a chandelier, a mounted lighting fixture that holds more than one bulb, a group of spaced-apart can lights, and so on.

Figure 9:
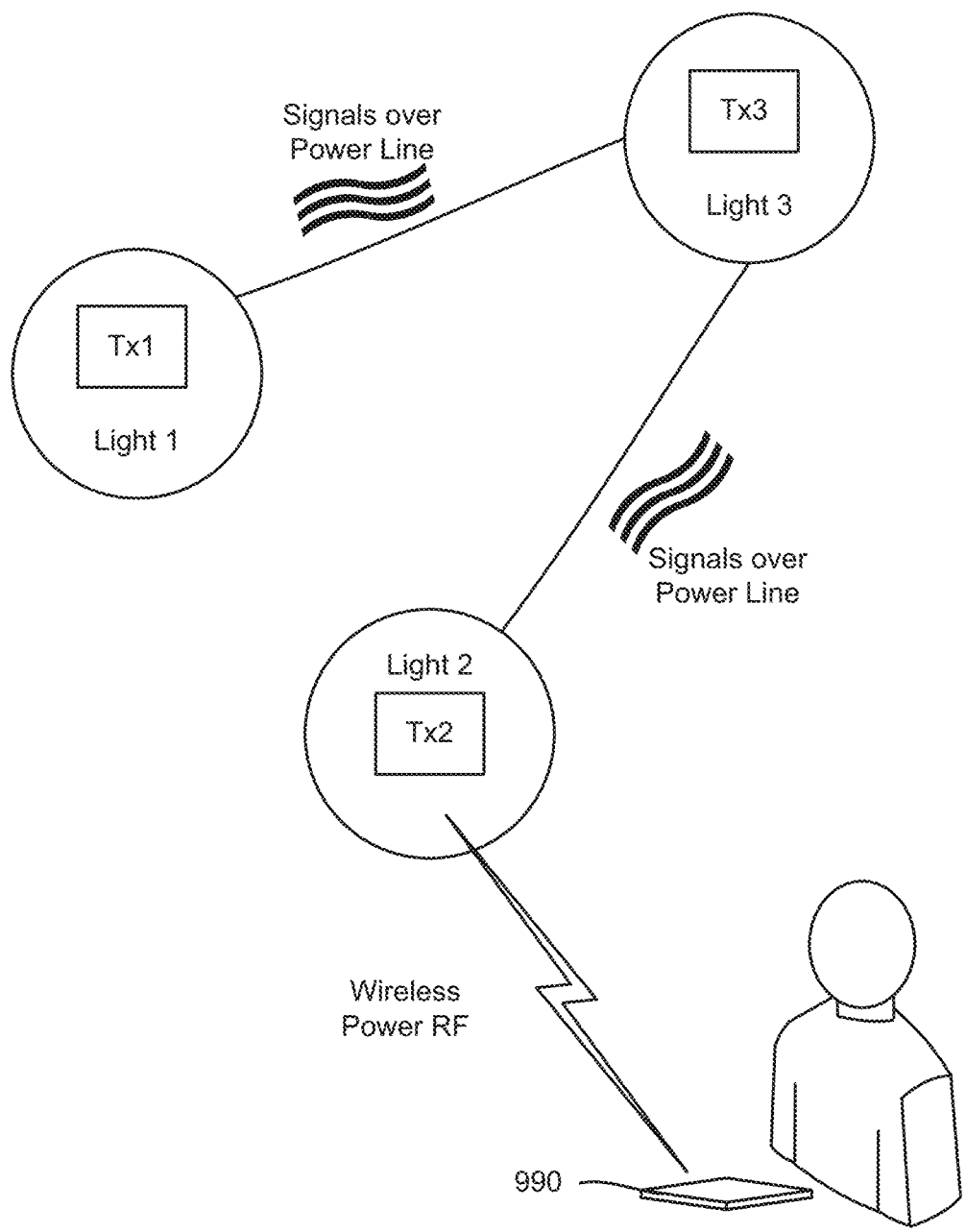
FIG. 9 shows example lighting devices with wireless power transmitters communicating with one another to coordinate wireless power transmission to a receiving device, in accordance with various example embodiments of the subject matter disclosed herein.

Multiple light bulbs close in proximity facilitate multiple low wattage wireless power transmitters (that easily meet governmental regulations), which can coordinate with each other to work as one (or more than one) more powerful wireless power transmitter, while expanding the transmission aperture. By signaling one another as in FIG. 9, proximity can be detected, e.g., using timing to determine distance between wireless power transmitters. When a group of wireless power transmitters Tx1-Tx3 decides to coordinate, for example, antenna selection, RF power signal timing and so forth can be determined as a unit for sending to at least one receiving device 990.

In another aspect, wireless power transmitters can be controlled by Wi-Fi data communications. As such, other functionality can be controlled by Wi-Fi data communications through a wireless power transmitter, acting as a Wi-Fi extender, for example. It is also feasible to use a different communication mechanism, e.g., receive data via Wi-Fi and output Bluetooth® signals to control a device's functionality.

By way of example, consider the electronic lock described above. A person otherwise locked out can call the resident, who can remotely unlock the door for that person using the Wi-Fi already at the wireless power transmitter along with some signaling to control the lock. It should also be noted that the wireless power transmitter can detect motion and to some extent contain or be linked to analytics that can recognize shapes and sizes; e.g., to report when a package is delivered, to indicate that a large or small person (or multiple people) are at the door, and so on.

In another aspect, the transmitter can embedded in a light fixture, in which the light fixture with the transmitter can power multiple devices at approximately a one meter distance, for example. The light can be controlled to indicate different states. By way of example, and not limitation, the light can flicker for n seconds (e.g., three seconds) if the user has a notification, e.g., as communicated by Wi-Fi, Bluetooth®, cellular or other wireless technologies. As another non-limiting example, the light can be dimmed (or brightened), e.g., briefly, to indicate when a receiver's batteries are full/empty. As another non-limiting example, the light intensity can be varied to represent different states that represent the wireless power receiver(s). With certain types of LEDs, output colors of a light can also be changed to similarly convey information with respect to wireless power state data and/or information received by the wireless power system.

As can be seen, existing electrical wiring infrastructure can be used to implement wireless power transmission. Lighting in sockets and the like is a typical example of existing electrical wiring infrastructure, although in certain situations other existing electrical wiring infrastructure (e.g., an outlet) may be present in a desirable location and thus similarly used. Some homes also contain wired smoke detectors, and thus provide another way to use that existing electrical wiring infrastructure for wireless power transmission.

Moreover, the space taken by a lighting device to generate a desired amount of light continues to get smaller, whereby the LED housing provides more room for wireless power transmitter(s)/antenna elements, which themselves are tending to become smaller over time. As a result, lighting provides a straightforward and inexpensive way to provide wireless power transmission in many scenarios, such as residential consumers.

Figure 11:
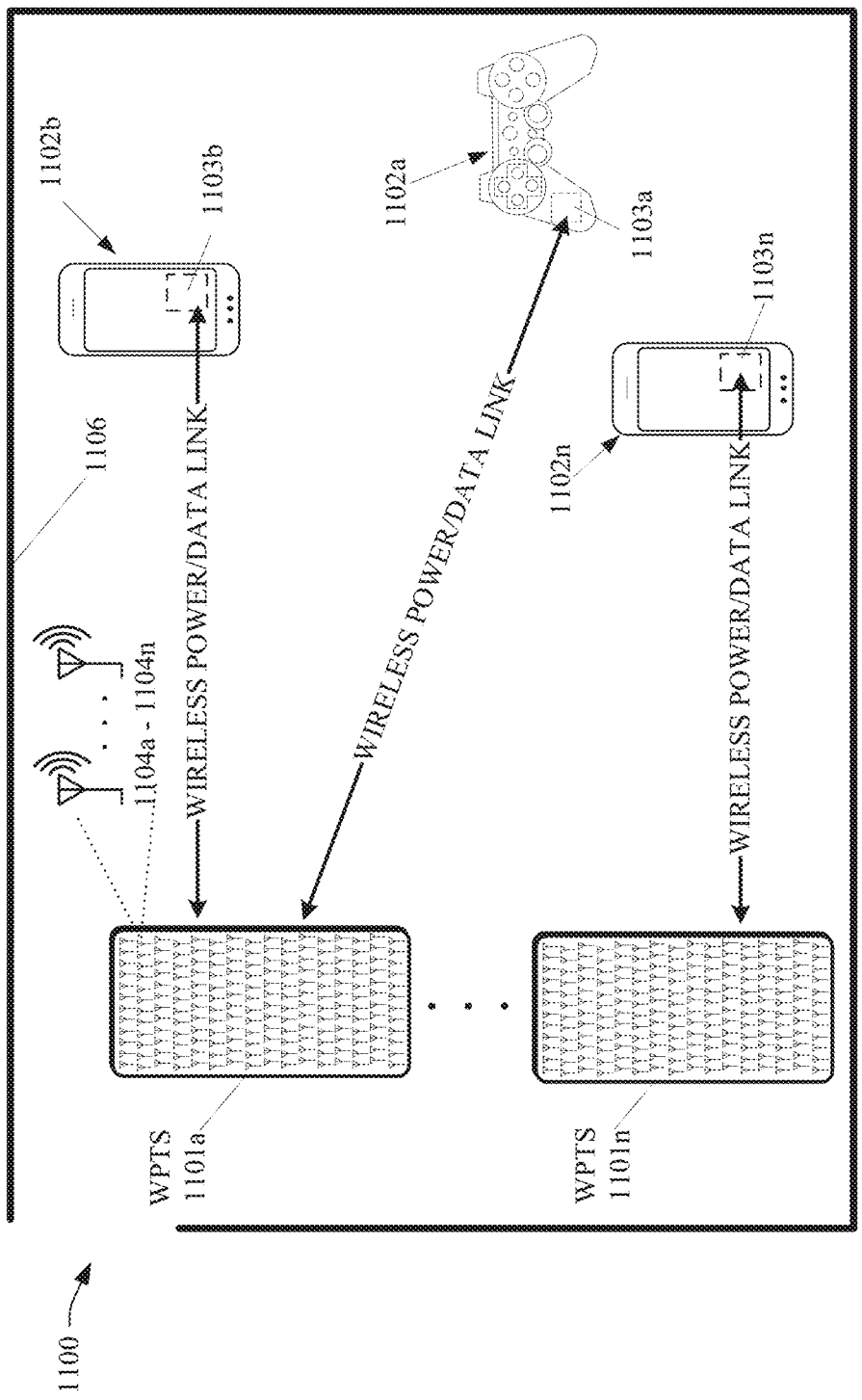
FIG. 11 depicts a block diagram of an example wireless power delivery environment illustrating wireless power delivery from one or more wireless power transmission systems to various wireless devices within the wireless power delivery environment, in accordance with various example embodiments of the subject matter disclosed herein.

FIG. 11 depicts a block diagram including an example wireless power delivery environment 1100 illustrating wireless power delivery from one or more wireless power transmission systems (WPTS) 1101a-n (also referred to as "wireless power delivery systems", "antenna array systems" and "wireless chargers") to various wireless devices 1102a-n within the wireless power delivery environment 1100, according to some embodiments. More specifically, FIG. 11 illustrates an example wireless power delivery environment 1100 in which wireless power and/or data can be delivered to available wireless devices 1102a-1102n having one or more wireless power receiver clients 1103a-1103n (also referred to herein as "clients" and "wireless power receivers"). The wireless power receiver clients are configured to receive and process wireless power from one or more wireless power transmission systems 1101a-1101n. Components of an example wireless power receiver client 1103 are shown and discussed in greater detail with reference to FIG. 14.

As shown in the example of FIG. 11, the wireless devices 1102a-1102n include mobile phone devices and a wireless game controller. However, the wireless devices 1102a-1102n can be any device or system that needs power and is capable of receiving wireless power via one or more integrated wireless power receiver clients 1103a-1103n. As discussed herein, the one or more integrated wireless power receiver clients receive and process power from one or more wireless power transmission systems 1101a-1101n and provide the power to the wireless devices 1102a-1102n (or internal batteries of the wireless devices) for operation thereof.

Each wireless power transmission system 1101 can include multiple antennas 1104a-n, e.g., an antenna array including hundreds or thousands of antennas, which are capable of delivering wireless power to wireless devices 1102a-1102n. In some embodiments, the antennas are adaptively-phased RF antennas. The wireless power transmission system 1101 is capable of determining the appropriate phases with which to deliver a coherent power transmission signal to the wireless power receiver clients 1103a-1103n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 1101 can have an embedded Wi-Fi hub for data communications via one or more antennas or transceivers.

The wireless devices 1102 can include one or more wireless power receiver clients 1103. As illustrated in the example of FIG. 11, power delivery antennas 1104a-1104n are shown. The power delivery antennas 1104a are configured to provide delivery of wireless radio frequency power in the wireless power delivery environment. In some embodiments, one or more of the power delivery antennas 1104a-1104n can alternatively or additionally be configured for data communications in addition to or in lieu of wireless power delivery. The one or more data communication antennas are configured to send data communications to and receive data communications from the wireless power receiver clients 1103a-1103n and/or the wireless devices 1102a-1102n. In some embodiments, the data communication antennas can communicate via Bluetooth™, Wi-Fi_33™, ZigBee™, etc. Other data communication protocols are also possible.

Each wireless power receiver client 1103a-1103n includes one or more antennas (not shown) for receiving signals from the wireless power transmission systems 1101a-1101n. Likewise, each wireless power transmission system 1101a-1101n includes an antenna array having one or more antennas and/or sets of antennas capable of emitting continuous wave or discrete (pulse) signals at specific phases relative to each other. As discussed above, each of the wireless power transmission systems 1101a-1101n is capable of determining the appropriate phases for delivering the coherent signals to the wireless power receiver clients 1102a-1102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 1101a-1101n can be connected to a power source such as, for example, a power outlet or source connecting the wireless power transmission systems to a standard or primary AC power supply in a building. Alternatively, or additionally, one or more of the wireless power transmission systems 1101a-1101n can be powered by a battery or via other mechanisms, e.g., solar cells, etc.

The wireless power receiver clients 1102a-1102n and/or the wireless power transmission systems 1101a-1101n are configured to operate in a multipath wireless power delivery environment. That is, the wireless power receiver clients 1102a-1102n and the wireless power transmission systems 1101a-1101n are configured to utilize reflective objects 1106 such as, for example, walls or other RF reflective obstructions within range to transmit beacon (or calibration) signals and/or receive wireless power and/or data within the wireless power delivery environment. The reflective objects 1106 can be utilized for multi-directional signal communication regardless of whether a blocking object is in the line of sight between the wireless power transmission system and the wireless power receiver clients 1103a-1103n.

As described herein, each wireless device 1102a-1102n can be any system and/or device, and/or any combination of devices/systems that can establish a connection with another device, a server and/or other systems within the example environment 1100. In some embodiments, the wireless devices 1102a-1102n include displays or other output functionalities to present data to a user and/or input functionalities to receive data from the user. By way of example, a wireless device 1102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 1102 can also be any wearable device such as watches, necklaces, rings or even devices embedded on or within the customer. Other examples of a wireless device 1102 include, but are not limited to, safety sensors (e.g., fire or carbon monoxide), electric toothbrushes, electronic door lock/handles, electric light switch controller, electric shavers, etc.

Although not illustrated in the example of FIG. 11, the wireless power transmission system 1101 and the wireless power receiver clients 1103a-1103n can each include a data communication module for communication via a data channel. Alternatively, or additionally, the wireless power receiver clients 1103a-1103n can direct the wireless devices 1102a-1102n to communicate with the wireless power transmission system via existing data communications modules. In some embodiments, the beacon signal, which is primarily referred to herein as a continuous waveform, can alternatively or additionally take the form of a modulated signal.

Figure 12:
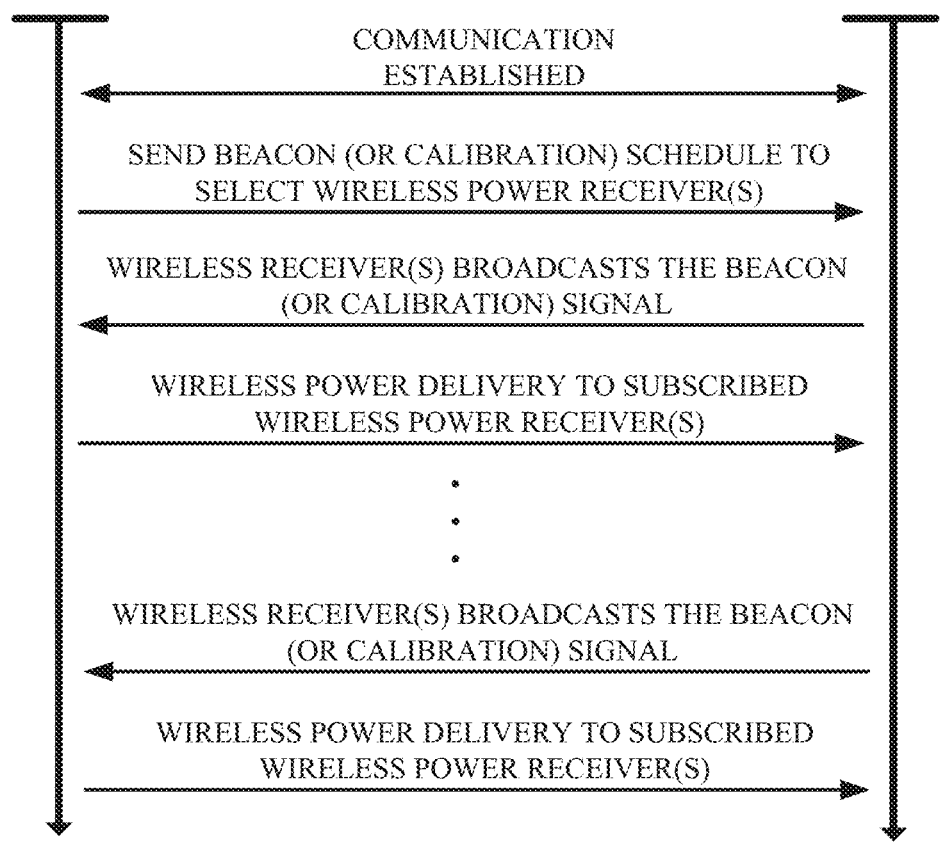
FIG. 12 depicts a sequence diagram illustrating example operations between a wireless power transmission system and a wireless power receiver client for commencing wireless power delivery, in accordance with various example embodiments of the subject matter disclosed herein.

FIG. 12 depicts a sequence diagram 1200 illustrating example operations between a wireless power delivery system (e.g., wireless power transmission system 1101 of FIG. 11) and a wireless power receiver client (e.g., FIG. 14) for establishing wireless power delivery in a multipath wireless power delivery, according to an embodiment. Initially, communication is established between the wireless power delivery system and the power receiver client. The initial communication can be, for example, a data communication link that is established via one or more antennas (e.g., 1104a-1104n) of the wireless power transmission system. As discussed, in some embodiments, one or more of the antennas can be data antennas, wireless power transmission antennas, or dual-purpose data/power antennas. Various information can be exchanged between the wireless power transmission system and the wireless power receiver client over this data communication channel. For example, wireless power signaling can be time sliced among various clients in a wireless power delivery environment. In such cases, the wireless power transmission system can send beacon schedule information, e.g., Beacon Beat Schedule (BBS) cycle, power cycle information, etc., so that the wireless power receiver client knows when to transmit (broadcast) its beacon signals and when to listen for power, etc.

Continuing with the example of FIG. 12, the wireless power transmission system selects one or more wireless power receiver clients for receiving power and sends the beacon schedule information to the selected wireless power receiver clients. The wireless power transmission system can also send power transmission scheduling information so that the wireless power receiver client knows when to expect (e.g., a window of time) wireless power from the wireless power transmission system. The wireless power receiver client then generates a beacon (or calibration) signal and broadcasts the beacon during an assigned beacon transmission window (or time slice) indicated by the beacon schedule information, e.g., BBS cycle. As discussed herein, the wireless power receiver client includes one or more antennas (or transceivers) that have a radiation and reception pattern in three-dimensional space proximate to the wireless device in which the wireless power receiver client is embedded.

The wireless power transmission system receives the beacon from the power receiver client and detects and/or otherwise measures the phase (or direction) from which the beacon signal is received at multiple antennas. The wireless power transmission system then delivers wireless power to the power receiver client from the multiple antennas based on the detected or measured phase (or direction) of the received beacon at each of the corresponding antennas. In some embodiments, the wireless power transmission system determines the complex conjugate of the measured phase of the beacon and uses the complex conjugate to determine a transmit phase that configures the antennas for delivering and/or otherwise directing wireless power to the wireless power receiver client via the same path over which the beacon signal was received from the wireless power receiver client.

In some embodiments, the wireless power transmission system includes many antennas. One or more of the many antennas may be used to deliver power to the power receiver client. The wireless power transmission system can detect and/or otherwise determine or measure phases at which the beacon signals are received at each antenna. The large number of antennas may result in different phases of the beacon signal being received at each antenna of the wireless power transmission system. As discussed above, the wireless power transmission system can determine the complex conjugate of the beacon signals received at each antenna. Using the complex conjugates, one or more antennas may emit a signal that takes into account the effects of the large number of antennas in the wireless power transmission system. In other words, the wireless power transmission system can emit a wireless power transmission signal from one or more antennas in such a way as to create an aggregate signal from the one or more of the antennas that approximately recreates the waveform of the beacon in the opposite direction. Said another way, the wireless power transmission system can deliver wireless RF power to the wireless power receiver clients via the same paths over which the beacon signal is received at the wireless power transmission system. These paths can utilize reflective objects 1106 within the environment. Additionally, the wireless power transmission signals can be simultaneously transmitted from the wireless power transmission system such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients within the power delivery environment according to, for example, the BBS, so that the wireless power transmission system can maintain knowledge and/or otherwise track the location of the power receiver clients in the wireless power delivery environment. The process of receiving beacon signals from a wireless power receiver client at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 13.

Figure 13:
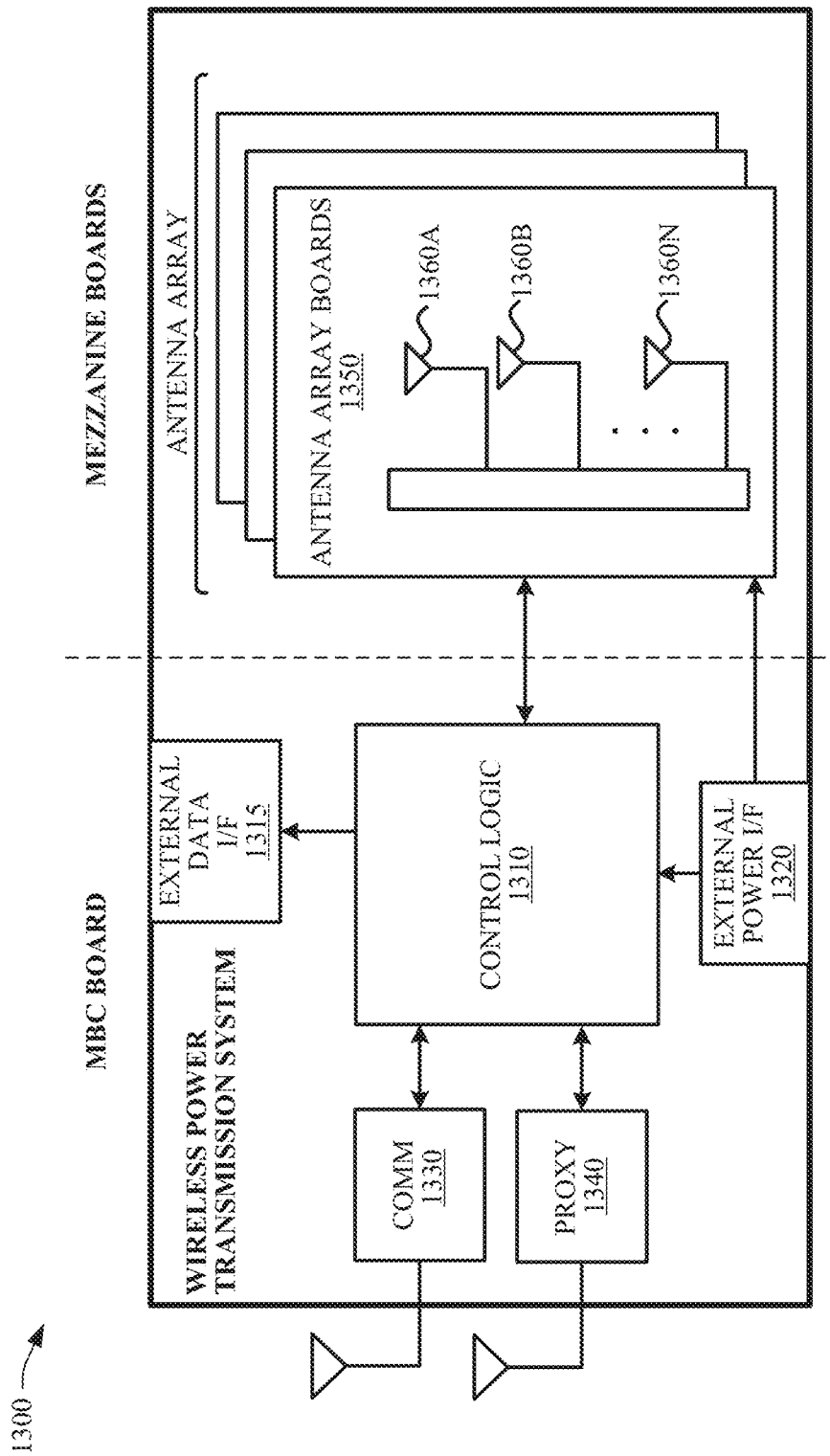
FIG. 13 depicts a block diagram illustrating example components of a wireless power transmission system, in accordance with various example embodiments of the subject matter disclosed herein.

FIG. 13 depicts a block diagram illustrating example components of a wireless power transmission system 1300, in accordance with an embodiment. As illustrated in the example of FIG. 13, the wireless power transmission system 1300 includes a master bus controller (MBC) board and multiple mezzanine boards that collectively comprise the antenna array. It should be appreciated that in other embodiment(s) (not shown), the wireless power transmission system 1300 can be communicatively coupled other such components, e.g., in addition to, or in lieu of, being communicatively coupled to the antenna array via the multiple mezzanine boards.

The MBC includes control logic 1310, an external data interface (I/F) 1315, an external power interface (I/F) 1320, a communication block 1330 and proxy 1340. The mezzanine boards (or antenna array boards 1350) each include multiple antennas 1360a-1360n. Some or all of the components can be omitted in some embodiments. Additional components are also possible. For example, in some embodiments only one of communication block 1330 or proxy 1340 may be included.

The control logic 1310 is configured to provide control and intelligence to the array components. The control logic 1310 may comprise one or more processors, FPGAs, memory units, etc., and direct and control the various data and power communications. The communication block 1330 can direct data communications on a data carrier frequency, such as the base signal clock for clock synchronization. The data communications can be Bluetooth™ WiFi™, ZigBee™, etc., including combinations or variations thereof.

Likewise, the proxy 1340 can communicate with clients via data communications as discussed herein. The data communications can be, by way of example and not limitation, Bluetooth™, WiFi™, ZigBee™ etc. Other communication protocols are possible.

In some embodiments, the control logic 1310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system over a data connection. This IoT information can be provided to via an external data interface 1315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1320 is configured to receive external power and provide the power to various components. In some embodiments, the external power interface 1320 may be configured to receive a standard external 24 Volt power supply. In other embodiments, the external power interface 1320 can be, for example, 120/240 Volt alternating current (AC) mains to an embedded direct current (DC) power supply that sources the required 12/24/48 Volt DC to provide the power to various components. Alternatively, the external power interface could be a DC power supply that sources the required 12/24/48 Volts DC. Alternative configurations are also possible.

In operation, the MBC, which controls the wireless power transmission system, receives power from a power source and is activated. The MBC then activates proxy antenna elements on the wireless power transmission system and the proxy antenna elements enter a default "discovery" mode to identify available wireless power receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 14:
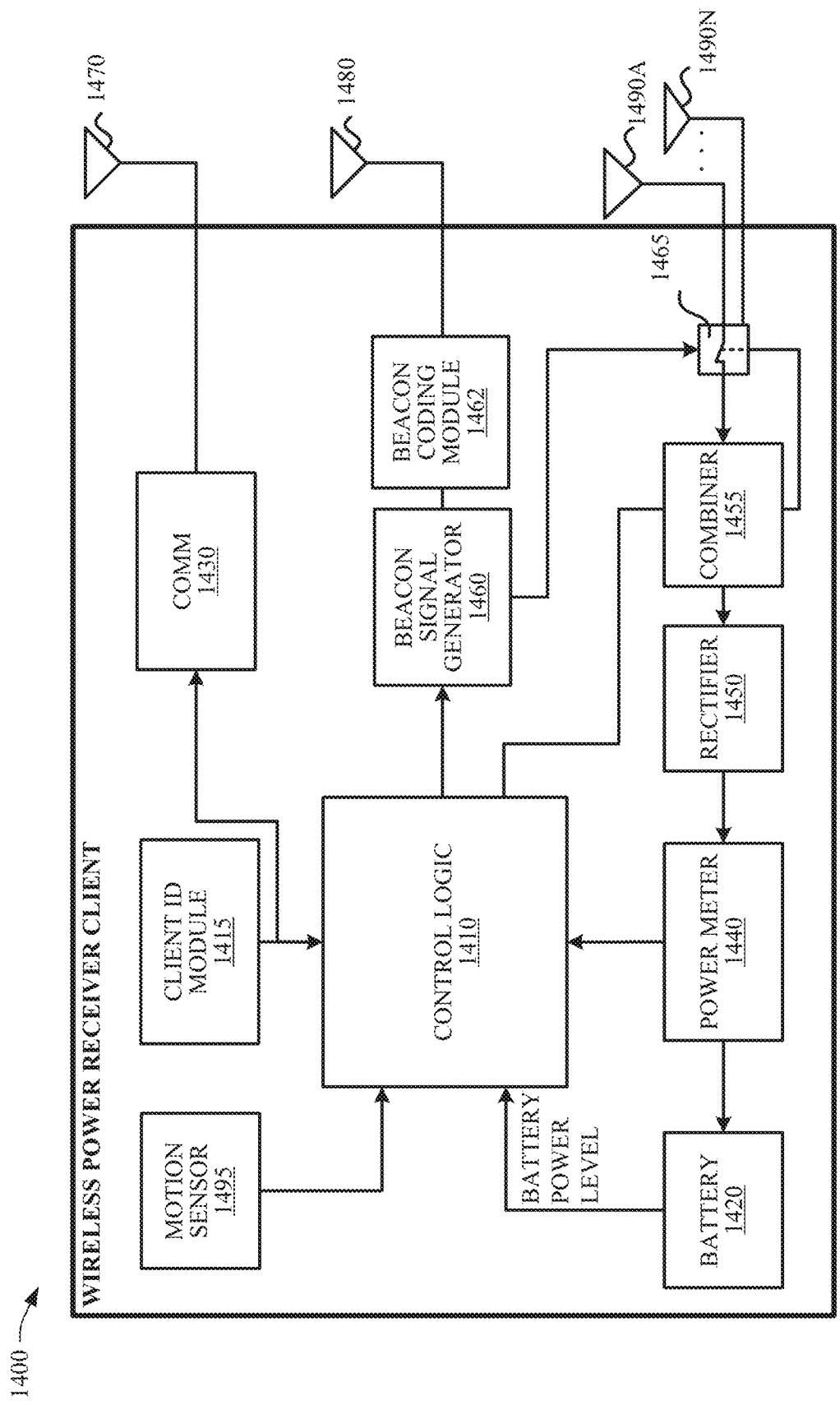
FIG. 14 depicts a block diagram illustrating example components of a wireless power receiver client, in accordance with various example embodiments of the subject matter disclosed herein.

FIG. 14 is a block diagram illustrating example components of a wireless power receiver client 1400, in accordance with some embodiments. As illustrated in the example of FIG. 14, the wireless power receiver client 1400 includes control logic 1410, battery 1420, an IoT control module 1425, communication block 1430 and associated antenna 1470, power meter 1440, rectifier 1450, a combiner 1455, beacon signal generator 1460, beacon coding unit 1462 and an associated antenna 1480, and switch 1465 connecting the rectifier 1450 or the beacon signal generator 1460 to one or more associated antennas 1490*a-n*. Some or all of the components can be omitted in some embodiments. For example, in some embodiments, the wireless power receiver client 1400 does not include its own antennas but instead utilizes and/or otherwise shares one or more antennas (e.g., Wi-Fi_33 antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 1455 receives and combines the received power transmission signals from the power transmitter in the event that the receiver 1400 has more than one antenna. The combiner can be any combiner or divider circuit that is configured to achieve isolation between the output ports while maintaining a matched condition. For example, the combiner 1455 can be a Wilkinson Power Divider circuit. The rectifier 1450 receives the combined power transmission signal from the combiner 1455, if present, which is fed through the power meter 1440 to the battery 1420 for charging. In other embodiments, each antenna's power path can have its own rectifier 1450 and the DC power out of the rectifiers is combined prior to feeding the power meter 1440. The power meter 1440 can measure the received power signal strength and provides the control logic 1410 with this measurement.

Battery 1420 can include protection circuitry and/or monitoring functions. Additionally, the battery 1420 can include one or more features, including, but not limited to, current limiting, temperature protection, over/under voltage alerts and protection, and coulomb monitoring.

The control logic 1410 receives and processes the battery power level from the battery 1420 itself. The control logic 1410 may also transmit/receive via the communication block 1430 a data signal on a data carrier frequency, such as the base signal clock for clock synchronization. The beacon signal generator 1460 generates the beacon signal, or calibration signal, transmits the beacon signal using either the antenna 1480 or 1490 after the beacon signal is encoded.

It may be noted that, although the battery 1420 is shown as charged by, and providing power to, the wireless power receiver client 1400, the receiver may also receive its power directly from the rectifier 1450. This may be in addition to the rectifier 1450 providing charging current to the battery 1420, or in lieu of providing charging. Also, it may be noted that the use of multiple antennas is one example of implementation and the structure may be reduced to one shared antenna.

In some embodiments, the control logic 1410 and/or the IoT control module 1425 can communicate with and/or otherwise derive IoT information from the device in which the wireless power receiver client 1400 is embedded. Although not shown, in some embodiments, the wireless power receiver client 1400 can have one or more data connections (wired or wireless) with the device in which the wireless power receiver client 1400 is embedded over which IoT information can be obtained. Alternatively, or additionally, IoT information can be determined and/or inferred by the wireless power receiver client 1400, e.g., via one or more sensors. As discussed above, the IoT information can include, but is not limited to, information about the capabilities of the device in which the wireless power receiver client 1400 is embedded, usage information of the device in which the wireless power receiver client 1400 is embedded, power levels of the battery or batteries of the device in which the wireless power receiver client 1400 is embedded, and/or information obtained or inferred by the device in which the wireless power receiver client is embedded or the wireless power receiver client itself, e.g., via sensors, etc.

In some embodiments, a client identifier (ID) module 1415 stores a client ID that can uniquely identify the wireless power receiver client 1400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 1495 can detect motion and signal the control logic 1410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 15A:
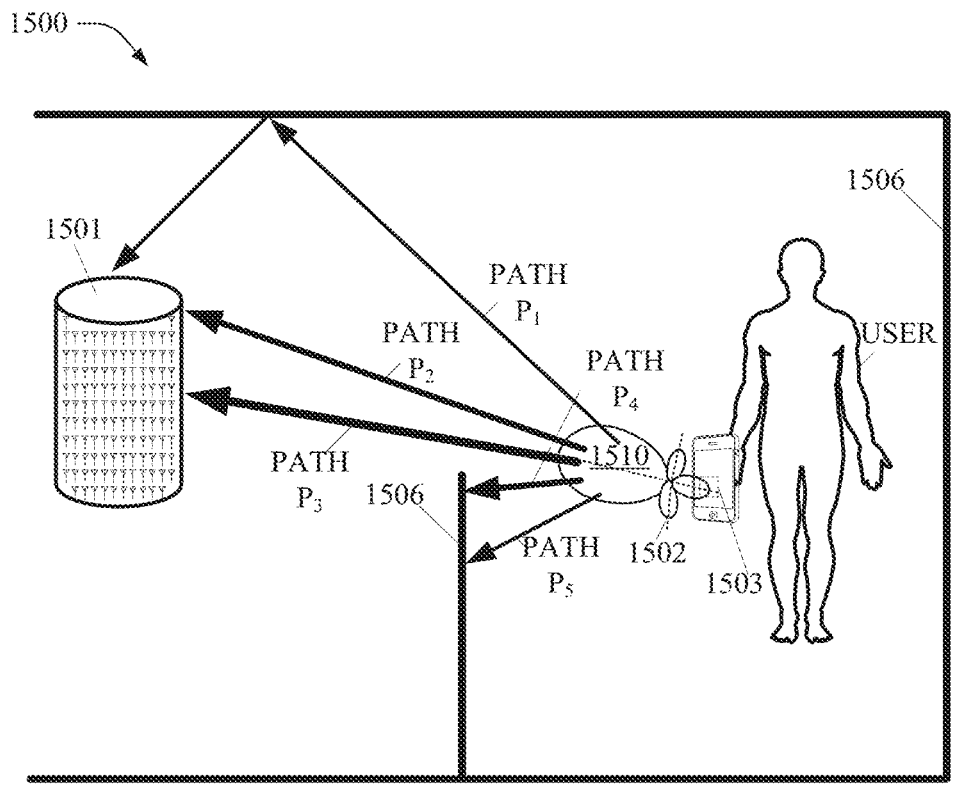
FIGS. 15A and 15B depict block diagrams illustrating example multipath wireless power delivery environments, in accordance with various example embodiments of the subject matter disclosed herein.
Figure 15B:
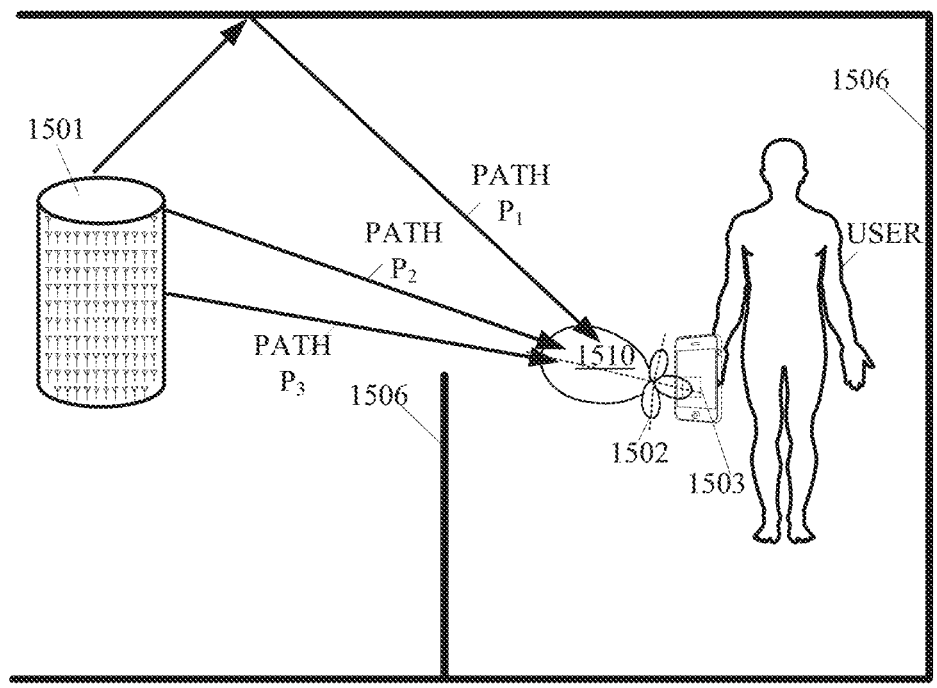

FIGS. 15A and 15B depict diagrams illustrating an example multipath wireless power delivery environment 1500, according to some embodiments. The multipath wireless power delivery environment 1500 includes a user operating a wireless device (e.g., 510, 1502, etc.) including one or more wireless power receiver clients (e.g., 1503). The wireless device 1502 can be wireless device as described herein, and the one or more wireless power receiver clients 1503 can be a wireless power receiver client 1400, although alternative configurations are possible. Likewise, wireless power transmission system 1501 can be any of those depicted and/or described herein, for example, although alternative configurations are possible. The multipath wireless power delivery environment 1500 includes reflective objects 1506 and various absorptive objects, e.g., users, or humans, furniture, etc.

Wireless device 1502 includes one or more antennas (or transceivers) that have a radiation and reception pattern 1510 in three-dimensional space proximate to the wireless device 1502. The one or more antennas (or transceivers) can be wholly or partially included as part of the wireless device 1502 and/or the wireless power receiver client (not shown). For example, in some embodiments one or more antennas, e.g., Wi-Fi_33, Bluetooth, etc. of the wireless device 1502 can be utilized and/or otherwise shared for wireless power reception. As shown in the examples of FIGS. 15A and 15B, the radiation and reception pattern 1510 comprises a lobe pattern with a primary lobe and multiple side lobes. Other patterns are also possible.

The wireless device 1502 transmits a beacon (or calibration) signal over multiple paths to the wireless power transmission system 1501. As discussed herein, the wireless device 1502 transmits the beacon in the direction of the radiation and reception pattern 1510 such that the strength of the received beacon signal by the wireless power transmission system, e.g., received signal strength indication (RSSI), depends on the radiation and reception pattern 1510. For example, beacon signals are not transmitted where there are nulls in the radiation and reception pattern 1510 and beacon signals are the strongest at the peaks in the radiation and reception pattern 1510, e.g., peak of the primary lobe. As shown in the example of FIG. 15A, the wireless device 1502 transmits beacon signals over five paths P1-P5. Paths P4 and P5 are blocked by reflective and/or absorptive object 1506. The wireless power transmission system 1501 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 15A and 15B, the radiation and reception pattern 1510 is a three-dimensional lobe shape. However, the radiation and reception pattern 1510 can be any number of shapes depending on the type or types, e.g., horn antennas, simple vertical antenna, etc. used in the antenna design. For example, the radiation and reception pattern 1510 can comprise various directive patterns. Any number of different antenna radiation and reception patterns are possible for each of multiple client devices in a wireless power delivery environment.

Referring again to FIG. 15A, the wireless power transmission system 1501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 1501, the power transmission system 1501 processes the beacon (or calibration) signal to determine one or more receive characteristics of the beacon signal at each of the multiple antennas. For example, among other operations, the wireless power transmission system 1501 can measure the phases at which the beacon signal is received at each of the multiple antennas or transceivers.

The wireless power transmission system 1501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 15B illustrates the wireless power transmission system 1501 transmitting wireless power via paths P1-P3 to the wireless device 1502. Advantageously, as discussed herein, the wireless power signal matches the client radiation and reception pattern 1510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 1501 measures the RSSI of the received beacon signal and if the beacon is less than a threshold value, the wireless power transmission system will not send wireless power over that path.

The three paths shown in the examples of FIGS. 15A and 15B are illustrated for simplicity, it is appreciated that any number of paths can be utilized for transmitting power to the wireless device 1502 depending on, among other factors, reflective and absorptive objects in the wireless power delivery environment. Although the example of FIG. 15A illustrates transmitting a beacon (or calibration) signal in the direction of the radiation and reception pattern 1510, it is appreciated that, in some embodiments, beacon signals can alternatively or additionally be omni-directionally transmitted.

Figure 16:
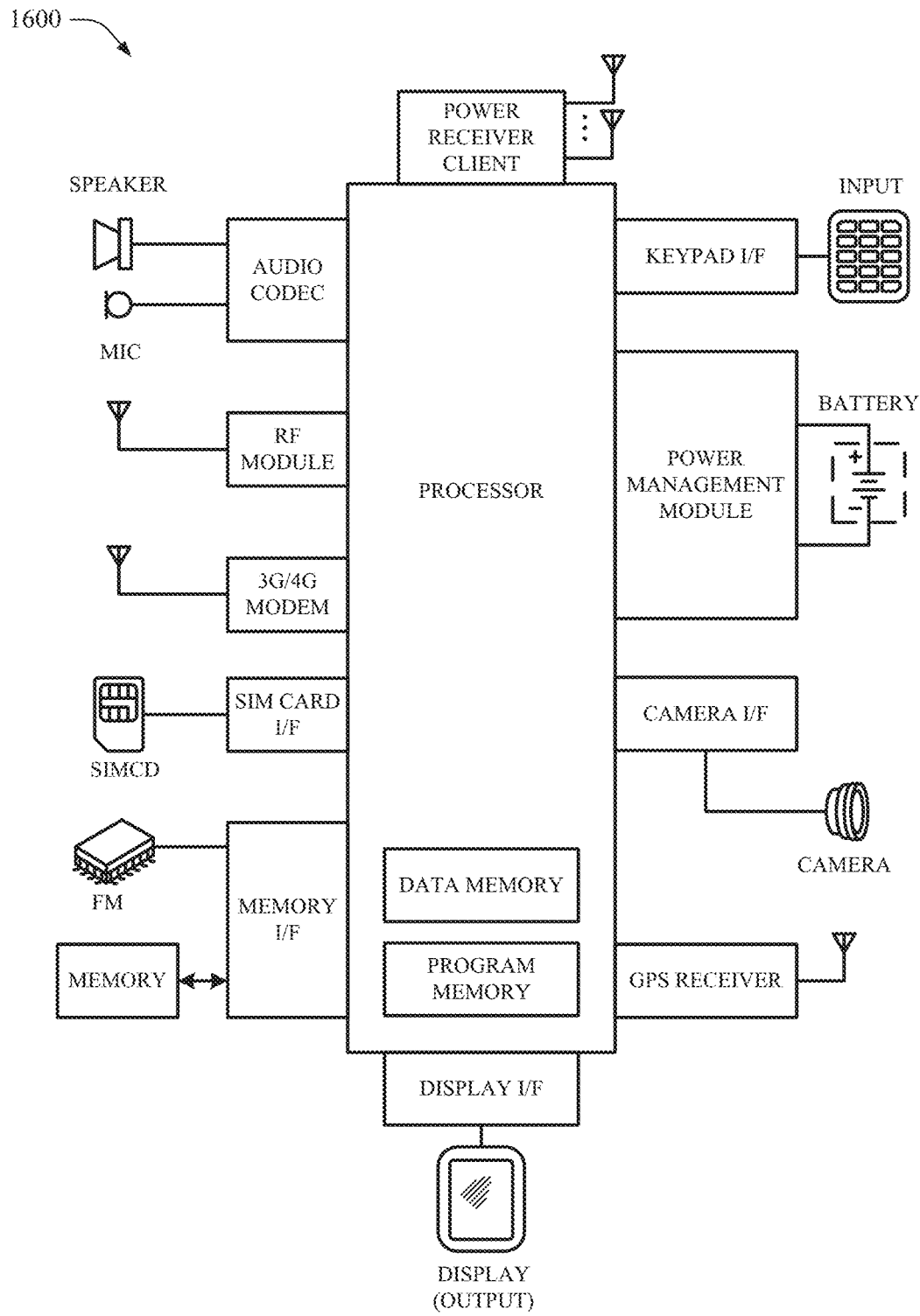
FIG. 16 depicts a block diagram illustrating example components of a representative mobile device or tablet computer with a wireless power receiver or client in the form of a mobile (or smart) phone or tablet computer device, in accordance with various example embodiments of the subject matter disclosed herein.

FIG. 16 depicts a block diagram illustrating example components of a representative mobile device (e.g., 510) or tablet computer 1600 with a wireless power receiver or client in the form of a mobile (or smart) phone or tablet computer device, according to an embodiment. Various interfaces and modules are shown with reference to FIG. 16, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RF identification (RFID) transceivers, along with antennas, can populate a PCB.

The wireless power receiver client can be a power receiver client 1603 of FIG. 16, although alternative configurations are possible. Additionally, the wireless power receiver client can include one or more RF antennas for reception of power and/or data signals from a charger, e.g., WPTS 1601 of FIG. 16.

Figure 17:
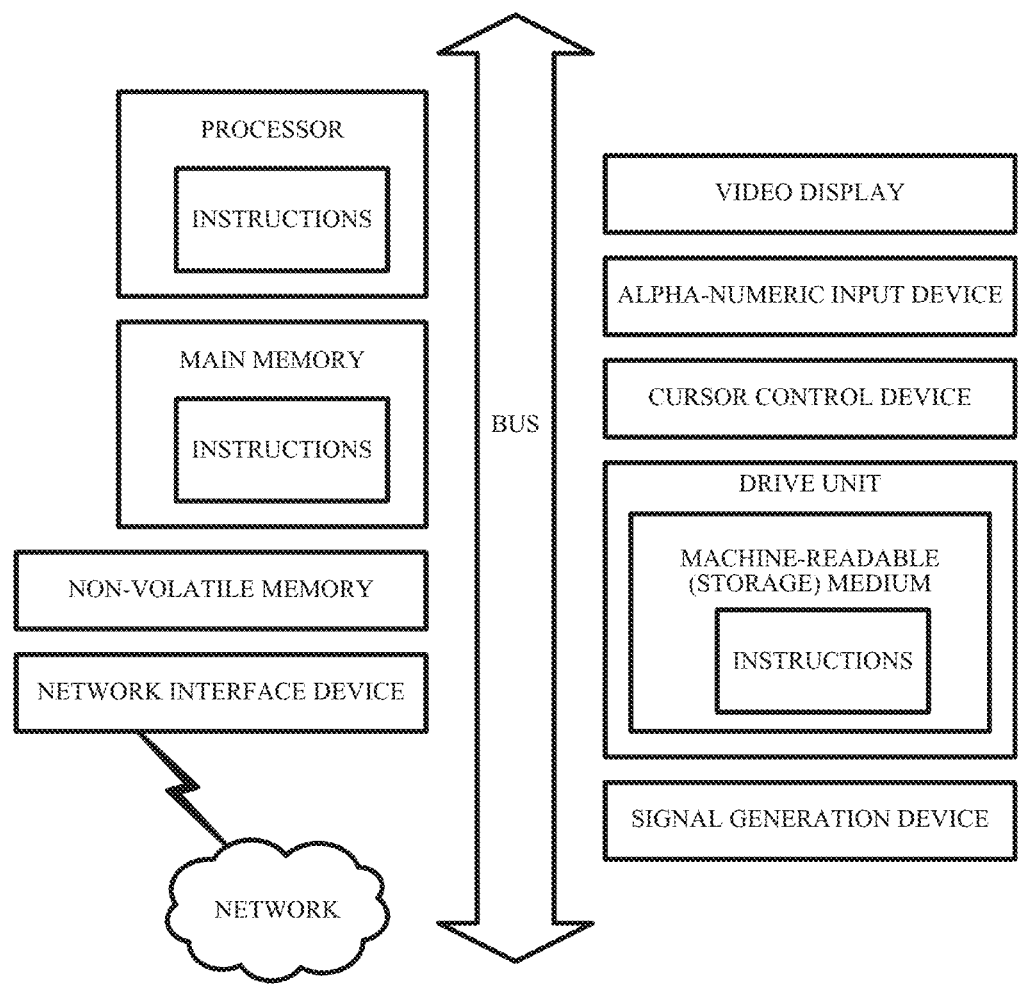
FIG. 17 depicts a diagrammatic representation of a machine, in an example form, of a computer system within which a set of instructions, for causing the machine to perform any one or more of the methodologies discussed herein, may be executed, in accordance with various example embodiments of the subject matter disclosed herein.

FIG. 17 depicts a diagrammatic representation of a machine, in the example form, of a computer system within which a set of instructions, for causing the machine to perform any one or more of the methodologies discussed herein, may be executed.

In the example of FIG. 17, the computer system includes a processor, memory, non-volatile memory, and an interface device. Various common components (e.g., cache memory) are omitted for illustrative simplicity. The computer system 1700 is intended to illustrate a hardware device on which any of the components depicted, e.g., in FIG. 1, FIG. 16, etc. (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk ROM (CD-ROM), electrically programmable ROM (EPROM), or electrically erasable ROM (EEPROM), a magnetic or optical card, or another form of storage for large amounts of data. Some of this data is often written, by a direct memory access process, into memory during execution of software in the computer 1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, an integrated services digital network (ISDN) modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 17 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

As it employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a light bulb or a tube-shaped lamp that
        receives, via a light control component comprising a relay, electrical operating power from an electrical wiring infrastructure of the system based on a wireless signal that is received from a signaling device of a wall switch of the system, and
        based on the wireless signal, generates, via the relay, light utilizing the electrical operating power; and
    a wireless power transmitter that receives, independently from the relay, the electrical operating power, wherein the wireless power transmitter is configured to transmit power to a wireless power receiving device, and wherein the wireless power transmitter is incorporated into the light bulb or the tube-shaped lamp.

2. The system of claim 1, wherein the light bulb comprises a screw-in base that facilitates connection to the electrical wiring infrastructure.

3. The system of claim 1, further comprising:
    a motion sensor communicatively coupled to the signaling device, wherein the signaling device generates the wireless signal based on an output of the motion sensor.

4. The system of claim 1, further comprising:
    a switch cover that maintains the wall switch in a closed position.

5. The system of claim 1, wherein the signaling device receives the power from the wireless power transmitter and generates the wireless signal via the power.

6. The system of claim 1, wherein the wireless power receiving device comprises an electrical locking device configured to receive the power from the wireless power transmitter.

7. The system of claim 6, wherein the electrical locking device is further configured to receive n data communications from the wireless power transmitter.

8. The system of claim 1, wherein the wireless power transmitter is configured to receive data via at least one of Bluetooth™, WiFi™, ZigBee™, or cellular based technology, and wherein the wireless power transmitter, based on the data, controls a configuration of the light bulb or the tube-shaped lamp to activate the light bulb or the tube-shaped lamp for a defined period of time.

9. The system of claim 1, wherein the wireless power transmitter is a first wireless power transmitter, and further comprising:
    a second wireless power transmitter communicably coupled to the first wireless power transmitter, wherein the first wireless power transmitter is configured to coordinate with the second wireless power transmitter to operate as a single wireless power transmitter unit to the wireless power receiving device.

10. The system of claim 1, wherein the wireless power transmitter is configured to power multiple wireless power receiving devices comprising the wireless power receiving device.

11. The system of claim 1, wherein the light bulb is configured to be mechanically coupled to a light socket, and wherein the light bulb is electrically coupled, based on the wireless signal that is received from the signaling device of the wall switch, to the light socket.

12. The system of claim 11, wherein the wireless power transmitter is configured to receive data via use of at least one of a Bluetooth™ protocol, a Wi-Fi™ protocol, a ZigBee™ protocol, or a cellular network protocol, and wherein the wireless power transmitter is configured to transmit the power based on the data.

13. The system of claim 1, wherein the wireless power transmitter is configured to receive data via at least one of a Bluetooth™ connection, a Wi-Fi™ connection, a ZigBee™ connection, or a radio frequency network connection, and wherein the wireless power transmitter is configured to modify a characteristic of illumination of the tube-shaped lamp based on the data.

14. The system of claim 13, wherein the wireless power transmitter is configured to change an output color of the tube-shaped lamp based on the data.

15. The system of claim 13, wherein the wireless power transmitter is configured to activate the tube-shaped lamp for a defined period of time based on the data.

16. The system of claim 1, wherein the wireless power transmitter is configured to receive data via at least one of Bluetooth™, WiFi™, ZigBee™, or cellular based technology, and wherein the wireless power transmitter, based on the data, controls a configuration of the light bulb or the tube-shaped lamp to change an output color of the light bulb or the tube-shaped lamp.

17. The system of claim 1, wherein the wireless power transmitter is configured to receive data via use of at least one of a Bluetooth™ protocol, a Wi-Fi™ protocol, a ZigBee™ protocol, or a cellular network protocol, and wherein the wireless power transmitter, based on the data, controls a configuration of the light bulb to activate the light bulb for a defined period of time.

18. The system of claim 1, wherein the wireless power transmitter is configured to receive data via use of at least one of a Bluetooth™ protocol, a Wi-Fi™ protocol, a ZigBee™ protocol, or a cellular network protocol, and wherein the wireless power transmitter, based on the data, controls a configuration of the light bulb to change an output color of the light bulb.

19. The system of claim 1, wherein the wireless power transmitter is a first wireless power transmitter, and further comprising:
 a second wireless power transmitter communicably coupled to the first wireless power transmitter, wherein the first wireless power transmitter is configured to coordinate with the second wireless power transmitter to operate as a single wireless power transmitter unit to the wireless power receiving device.

* * * * *